(12) United States Patent
Mossman

(10) Patent No.: US 8,938,940 B2
(45) Date of Patent: Jan. 27, 2015

(54) CROP DIVIDER FOR AN AGRICULTURAL HARVESTING HEAD

(71) Applicant: Deere & Company, Moline, IL (US)

(72) Inventor: Michael W Mossman, Silvis, IL (US)

(73) Assignee: Deere & Company, Moline, IL (US)

( * ) Notice: Subject to any disclaimer, the term of this patent is extended or adjusted under 35 U.S.C. 154(b) by 85 days.

(21) Appl. No.: 13/665,688

(22) Filed: Oct. 31, 2012

(65) Prior Publication Data

US 2014/0116020 A1 May 1, 2014

(51) Int. Cl.
*A01D 65/00* (2006.01)
*A01D 63/04* (2006.01)

(52) U.S. Cl.
CPC ........................... *A01D 63/04* (2013.01)
USPC .............................................. 56/314

(58) Field of Classification Search
USPC .................................. 56/119, 314
See application file for complete search history.

(56) References Cited

U.S. PATENT DOCUMENTS

| 1,936,760 | A | * | 11/1933 | Hitchcock | 56/103 |
| 2,349,905 | A | * | 5/1944 | Hyman | 56/119 |
| 2,963,845 | A | * | 12/1960 | Matile | 56/314 |
| 3,478,499 | A | * | 11/1969 | Van Der Lely | 56/11.9 |
| 3,967,439 | A | * | 7/1976 | Mott | 56/314 |
| 4,191,006 | A | * | 3/1980 | Kerber et al. | 56/11.6 |
| 4,227,368 | A | * | 10/1980 | Mossman et al. | 56/106 |
| 4,435,946 | A | * | 3/1984 | Erickson | 56/15.6 |
| 4,493,181 | A | * | 1/1985 | Glendenning et al. | 56/314 |
| 4,700,537 | A | * | 10/1987 | Emmert | 56/314 |
| 4,835,954 | A | * | 6/1989 | Enzmann | 56/303 |
| 5,806,292 | A | | 9/1998 | Luecke | |
| 7,350,345 | B2 | * | 4/2008 | Slabbinck et al. | 56/119 |
| 2004/0107685 | A1 | | 6/2004 | Resing et al. | |
| 2008/0155954 | A1 | * | 7/2008 | Schlipf | 56/10.2 E |

FOREIGN PATENT DOCUMENTS

| GB | 1156662 A | 7/1969 |
| SU | 665848 A | 6/1979 |
| SU | 1033054 A | 8/1983 |
| SU | 1683548 A1 | 10/1991 |
| WO | 2009/136274 A1 | 11/2009 |

OTHER PUBLICATIONS

Eurasian Search Report issued in counterpart application No. 201301035, dated Apr. 30, 2014 (2 pages).
European Search Report in Counterpart Application No. 13188824. 0, dated Feb. 17, 2014 (6 pages).

* cited by examiner

*Primary Examiner* — Thomas B Will
*Assistant Examiner* — Mai Nguyen

(57) ABSTRACT

A crop divider (110, 112) for an agricultural harvesting head (100) is pivotally coupled to a ground engaging arm (136) that is pivotally coupled to a frame (102) of the agricultural harvesting head (100). A mechanical link (154) is also coupled to both the crop divider (110, 112) and to the frame (102) to support the crop divider (110, 112) as the ground engaging arm (136) pivots up and down.

17 Claims, 4 Drawing Sheets

CROP DIVIDER FOR AN AGRICULTURAL HARVESTING HEAD

FIELD

The invention relates to crop dividers for agricultural harvesting heads.

BACKGROUND

Crop dividers are provided on agricultural harvesting heads to divide the crop going into the agricultural harvesting head from crop adjacent to the agricultural harvesting head.

Crop dividers are pointed implements that extend forward from the agricultural harvesting head. On each end of the agricultural harvesting head and are disposed with a leading point that is close to the ground, adjacent to the roots of the plants to be harvested. They work much like the tines of a comb work for parting hair. The crop dividers gently divide the crop into the portion of crop to be directed at the knife for cutting and harvesting the crop and the crop that is not to be immediately harvested but should not be damaged.

To most effectively separate the crop, the pointed forward ends of the crop dividers must travel extremely close to the ground passing between the lower stock portion of the plants, then gradually moving upward and separating the plants with roots on one side of the crop divider from the plants with roots on the other side of the crop divider, again, much as the tines of a comb separate hair.

As the ground contour changes up and down, the points of crop dividers can stick into the ground and be damaged. It would be beneficial to have a crop divider that was less susceptible to this problem.

It is an object of this invention to provide such a crop divider.

SUMMARY

In accordance with a first aspect of the invention, a crop divider is provided for an agricultural harvesting head, the agricultural harvesting head being configured to travel in a first direction through an agricultural field harvesting crops, the agricultural harvesting head having a frame that extends transversely to the first direction of travel, the frame having two laterally opposite ends, wherein a ground engaging arm is pivotally coupled to the frame and extends forward from the frame at each of the laterally opposite ends, the crop divider comprising a forward portion pivotally coupled to said ground engaging arm at a first pivot joint, and a mechanical link coupled to the forward portion and coupled to the frame, wherein the mechanical link constrains the forward portion to pivot counterclockwise with respect to the ground engaging arm when the ground engaging arm pivots clockwise with respect to the frame, and to pivot clockwise with respect to the ground engaging arm when the ground engaging arm pivots counterclockwise.

The forward portion may at least partly enclose a gearbox for driving a reciprocating knife.

The forward portion may have an inverted teardrop shape in cross-section.

The forward portion may pivot upward with respect to the ground engaging arm when the ground engaging arm pivots downward with respect to the frame, and the forward portion may pivot downward with respect to the ground engaging arm when the ground engaging arm pivots upward (with respect to frame.

A minimum positive gap may be provided between the bottom surface of the forward portion and ground that is horizontal.

The minimum positive gap may be provided between the bottom surface of the forward portion and ground that is horizontal over the entire operating range of pivotal positions of the ground engaging arm with respect to the frame.

The first pivot joint may be located at the bottom rear of the forward portion.

The mechanical link may be coupled to the forward portion at a point above and forward of the first pivot joint.

The crop divider may further include a rear portion fixed to the frame behind the front portion.

In accordance with a second aspect of the invention, a crop divider for an agricultural harvesting head is provided, wherein the agricultural harvesting head is configured to travel in a first direction through an agricultural field harvesting crops, wherein the agricultural harvesting head has a frame that extends transversely to the first direction of travel, the frame has two laterally opposite ends, and a ground engaging arm is pivotally coupled to the frame and extends forward from said frame at each of the laterally opposite ends, the crop divider comprising a forward portion pivotally coupled to said ground engaging arm at a first pivot joint, and a fore-and-aft extending mechanical link having a front end pivotally coupled to the forward portion and having a rear end pivotally coupled to the frame, wherein the mechanical link constrains the forward portion to maintain a minimum positive gap between the bottom surface of the forward portion and ground that is horizontal as the ground engaging arm pivots with respect to the frame.

The forward portion may at least partly enclose a gearbox for driving a reciprocating knife.

The forward portion may have an inverted teardrop shape in cross-section.

The forward portion may pivot upward with respect to the ground engaging arm when the ground engaging arm pivots downward with respect to the frame, and the forward portion may pivot downward with respect to the ground engaging arm when the ground engaging arm pivots upward (with respect to frame.

The mechanical link may constrain the forward portion to pivot counterclockwise with respect to the ground engaging arm when the ground engaging arm pivots clockwise with respect to the frame, and may constrain it to pivot clockwise with respect to the ground engaging arm when the ground engaging arm pivots counterclockwise.

The minimum positive gap may be provided between the bottom surface of the forward portion and ground that is horizontal over the entire operating range of pivotal positions of the ground engaging arm with respect to the frame.

The first pivot joint may be located at the bottom rear of the forward portion.

The mechanical link may be coupled to the forward portion at a point above and forward of the first pivot joint.

The crop divider may further comprise a rear portion fixed to the frame behind the front portion.

DETAILED DESCRIPTION

Figure 1:
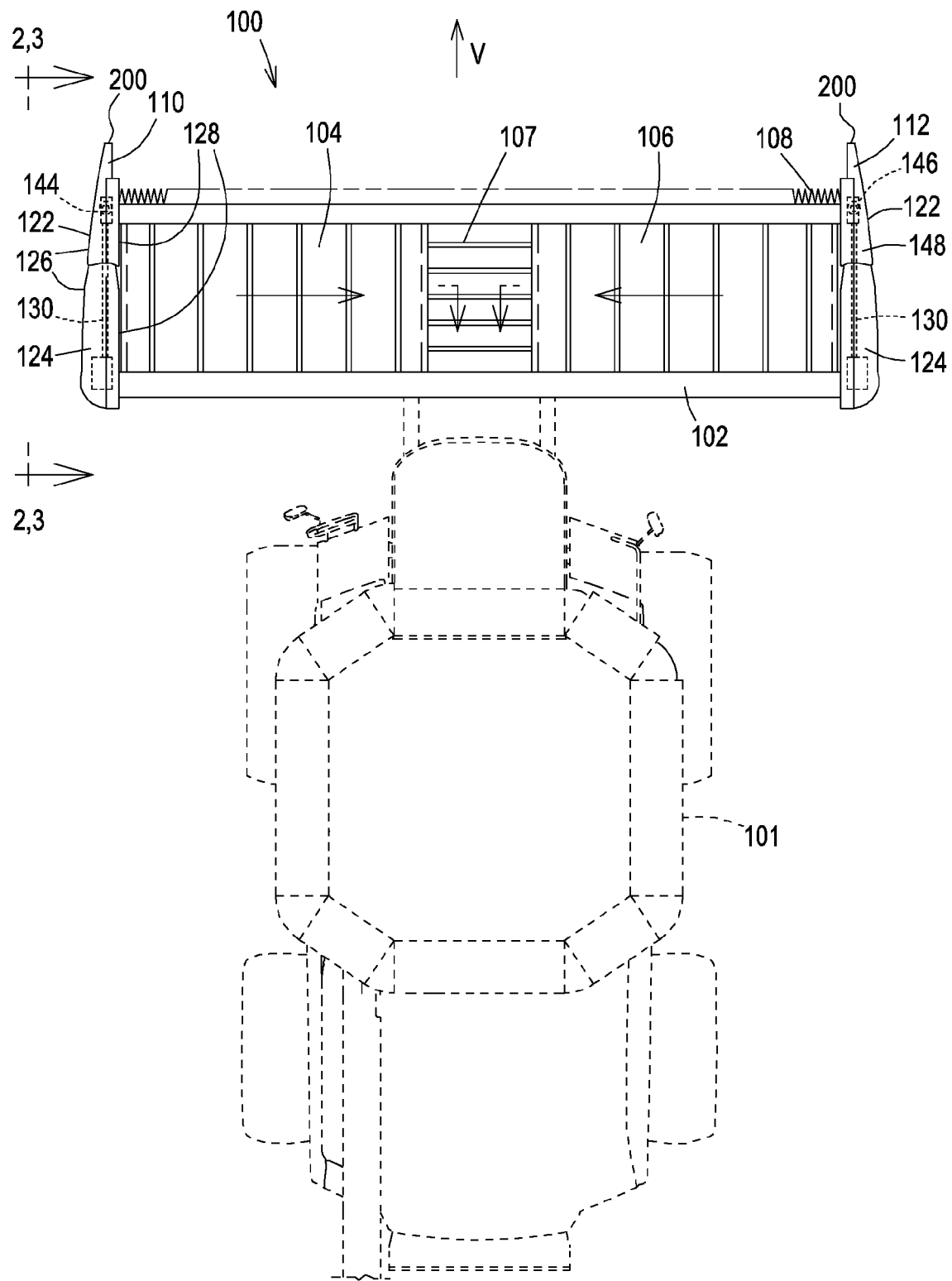
FIG. 1 is a plan view of an agricultural harvesting head showing a crop divider on each end of the harvesting head.

Referring to FIG. 1, an agricultural harvesting head 100 is carried on an agricultural harvesting vehicle 101 for travel through an agricultural field harvesting crop. The agricultural harvesting head 100 comprises a laterally extending frame 102, left side conveyor 104, right side conveyor 106, center conveyor 107, reciprocating knife 108, left side crop divider 110, and right side crop divider 112.

The agricultural harvesting head 100 travels through the field in the direction indicated by the arrow "V". The agricultural harvesting head 100 moves forward with standing crop plants being initially engaged by the reciprocating knife 108. Crop plants at either end of the agricultural harvesting head 100 initially engage the forwardmost tips 200 of the left side crop divider 110 and the right side crop divider 112. As the agricultural harvesting head 100 travels forward, the crop dividers 110, 112 separate the crop plants, directing the crop plants either against the reciprocating knife 108, or directing the crop plants outward of the agricultural harvesting head 100 where they can be harvested on a subsequent pass of the agricultural harvesting head 100.

Once the crop has been separated into outside plants that will not be harvested (yet) and inside plants between the two crop dividers and in front of the reciprocating knife 108, the crop between the two crop dividers is engaged by the reciprocating knife 108 disposed close to the ground. The reciprocating knife 108 severs the stalks of the plants adjacent to the ground. A reel of conventional arrangement (not shown) is disposed above the crop plants and directs the crop plants onto the left side conveyor 104, the right side conveyor 106, and the center conveyor 107. These conveyors convey the crop in the directions indicated by the arrows superimposed on top of the conveyors toward an aperture in the frame 102. The crop then travels into a feederhouse elevator, and thence into the agricultural vehicle 101 which supports the agricultural harvesting head 100 for travel through the field.

Agricultural harvesting vehicle 101, here shown as an agricultural combine configured to thresh, separate, and clean the grain from the crop plants, forms no part of the present invention. Agricultural harvesting head 100 can be mounted on a variety of other machines, such as wind rowers, forage harvesters, cotton harvesters, and the like.

Left side crop divider 110 and right side crop divider 112 are typically formed of a lightweight material, for example formed metal panels, plastic panels, rotomolded plastic shells, or the like. Left side crop divider 110 and right side crop divider 112 are formed with a smooth outer surface to permit the stalks of the crop plants to flow easily along the outer surface of the crop dividers, permitting the crop dividers to gently pull adjacent plants apart without uprooting them. In this manner, the crop plants that engage the crop dividers and are on the outside of the crop dividers are preserved with their grain intact for harvesting during subsequent passes of the agricultural harvesting head 100 through the field.

Left side crop divider 110 and right side crop divider 112 are configured to follow the ground closely. In particular, a forward portion 122 of each crop divider is not rigidly mounted to the frame 102, but is permitted to rise and fall in order that the forwardmost tips 200 of each crop divider 110, 112 can reach between the plant stalks at a point very close to the ground and begin the process of separating adjacent plant stalks without substantially damaging them. A rear portion 124 of each crop divider 110, 112 is fixed to the frame 102 of the agricultural harvesting head 100. This rear portion 124 is provided with smooth curves that merge into the smooth curves of the forward portions 122 such that as the crop passes the junction between the forward portion 122 and the rear portion 124, the crop plants are not excessively damaged.

The crop dividers 110, 112 surround irregularly shaped mechanical components that would damage crop plants if they were not shielded by crop dividers 110, 112. For that reason, crop dividers 110, 112, have hollow interiors that are configured to receive and surround these mechanical components. Crop dividers 110, 112 are generally in the form of an inverted "U", having an outer wall 126, an inner wall 128, and a top surface 130. The mechanical components are disposed inside the space defined between these walls and surface.

Figure 2:
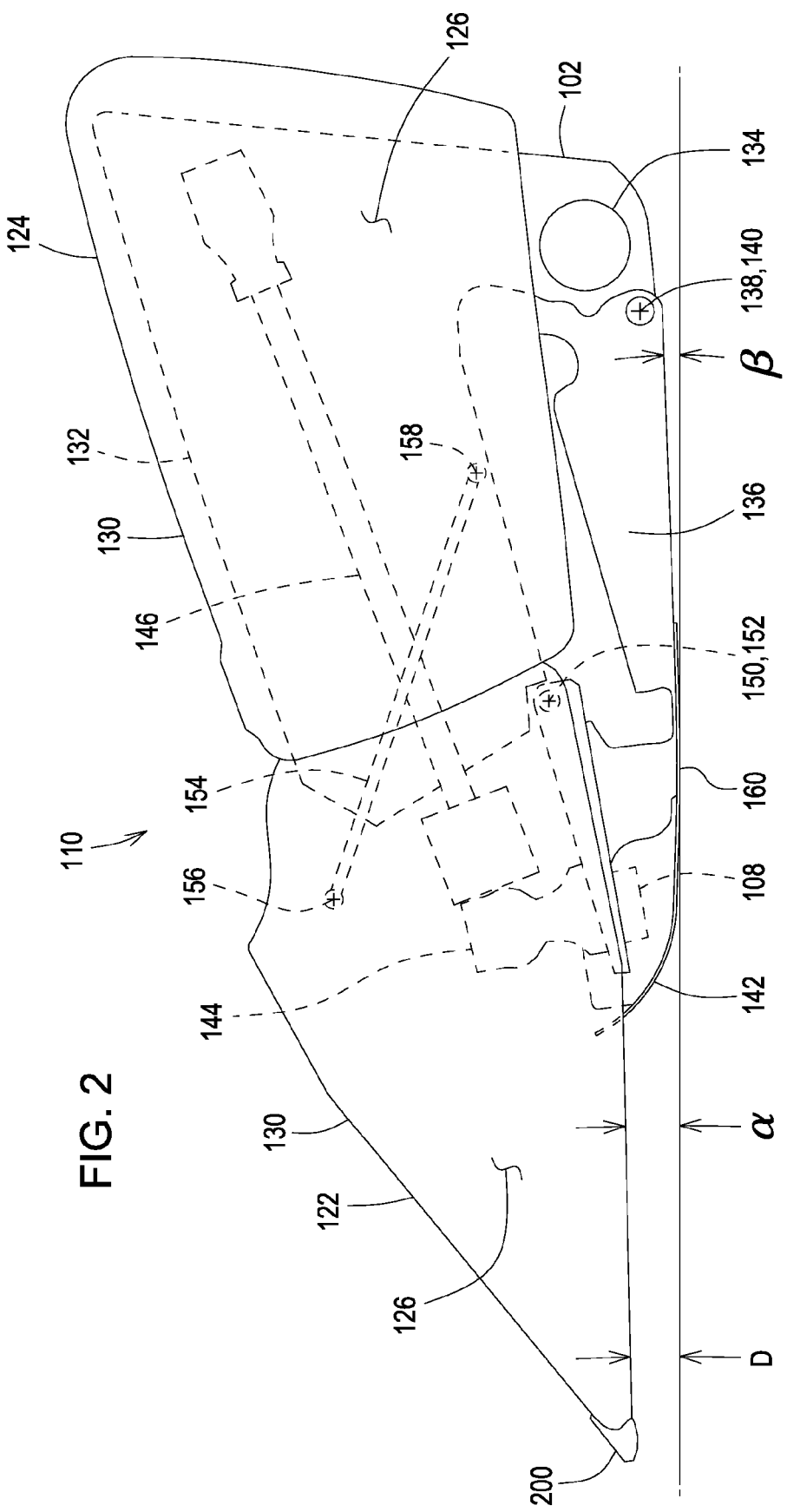
FIG. 2 is a left side end view of the agricultural harvesting head of FIG. 1 showing the agricultural harvesting head in a lowered position.
Figure 3:
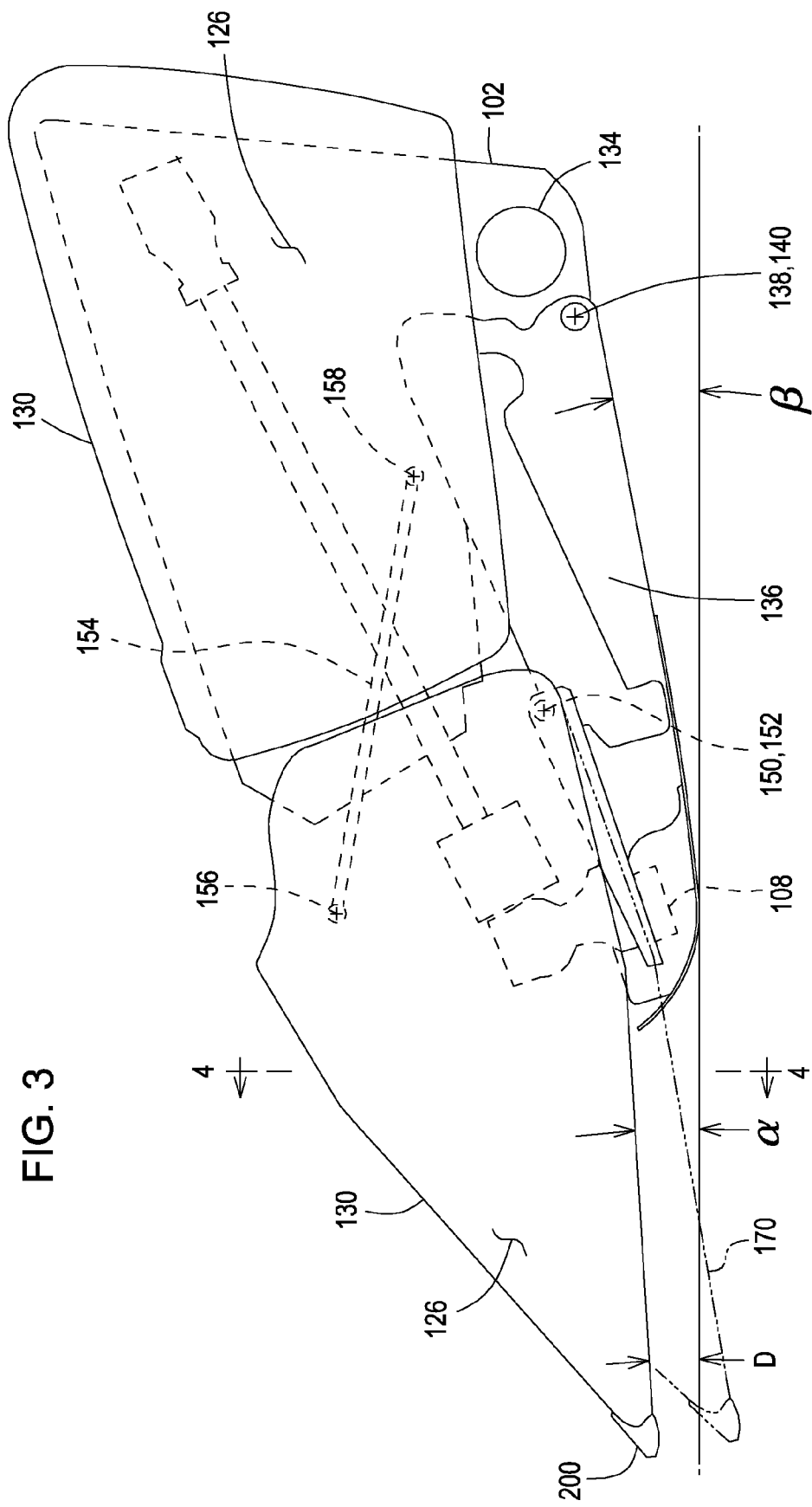
FIG. 3 is a left side end view of the agricultural harvesting head of FIGS. 1 and 2 showing the agricultural harvesting head frame in a raised position above the lowered position of FIG. 2.

In FIG. 2 and FIG. 3, the crop divider 110 at the left end of the agricultural harvesting head 100 is shown. The crop divider 112 at the right end of the agricultural harvesting head 100 is identically constructed to the crop divider 110 at the left end of agricultural harvesting head 100, except it is in mirror image form. The discussion below regarding crop divider 110 is therefore equally applicable to crop divider 112.

The configuration of FIG. 2 shows the agricultural harvesting head in its close to lowest possible operating position. The bottom of the agricultural harvesting head 100 rests upon the ground with a ground engaging arm 136 being pivoted by the ground to its uppermost position.

The configuration of FIG. 3 shows the agricultural harvesting head 100 in its close to highest possible operating position. The ground engaging arm 136 has reached the lowest position it can reach and still rest upon the ground holding the reciprocating knife 108 just above the ground at its proper operating height slightly above the surface of the ground.

Referring to FIG. 2, frame 102 comprises a frame member 132 at the left end of the frame 102 and a laterally extending frame member 134 that is fixed to the frame member 132. Frame member 132 extends forward from frame member 134. The ground engaging arm 136 is pivotally coupled to frame 102 at a pivot joint 138, which defines a pivotal axis 140 that extends generally horizontally and transverse to the direction of travel V. Ground engaging arm 136 extends forward from the pivot joint 138 and includes a forward portion 142 (often called a "skid shoe") that is configured to rest on the ground and skid along the surface of the ground as the agricultural harvesting head 100 travels through the field harvesting crop. Forward portion 142 maintains contact with the ground as the frame 102 of the agricultural harvesting head 100 travels over the ground moving slightly up and down as the agricultural harvesting head 100 supported on the front of the vehicle bounces up and down.

A gear box 144 is fixed to a forward end of the ground engaging arm 136. The gear box 144 is driven by a drive shaft 146 that extends forward from a rear portion of the agricultural harvesting head 100. The gear box 144 is coupled to and drives the left half of reciprocating knife 108. The right half of reciprocating knife 108 is coupled to and is driven by an identically disposed gearbox 146 located on the right side of the agricultural harvesting head 100 on an identical ground engaging arm 148.

Forward portion 122 of crop divider 110 extends around the upper portions of ground engaging arm 136 and shields the gearbox 144 from the oncoming crop. In this manner, forward portion 122 prevents crop from becoming tangled around the mechanical components disposed at the forward end of ground engaging arm 136.

Forward portion 122 is pivotally coupled to ground engaging arm 136 at a pivot joint 150. Pivot joint 150 defines a pivotal axis 152 of forward portion 122 with respect to ground engaging arm 136 that extends transversely with respect to the direction of travel V and generally parallel to the ground. Pivot joint 150 constrains forward portion 122 to pivot with respect to ground engaging arm 136 about pivotal axis 152.

Forward portion 122 is elevated slightly above the ground a distance "D" at its forward end. This distance D ensures that the forward portion 122 does not bury itself in the ground as it travels through the field.

Forward portion 122 is also elevated above the contact point 160 of ground engaging arm 136 with the ground.

In order to maintain the forward portion 122 of crop divider 110 this distance "D" above the ground, a mechanical link 154 is pivotally coupled to forward portion 122 at a pivot joint 156. Mechanical link 154 is coupled at its opposite end to frame 102 at pivot joint 158.

This arrangement of forward portion 122 permits it to maintain a positive distance or gap between the bottom of forward portion 122 and the ground as the agricultural harvesting head 100 bounces up and down traveling through the agricultural field harvesting crop.

This effect can be seen by comparing the position and orientation of forward portion 122 in FIG. 2 with the position and orientation of forward portion 122 in FIG. 3. In both, the close to highest operating position (shown in FIG. 3) and the close to lowest operating position (shown in FIG. 2) of agricultural harvesting head 100 there is a positive distance or gap between the lowest point of forward portion 122 and the surface of the ground. The intermediate positions are not shown, but a kinematic comparison of the two figures will prove that all the intermediate rotational positions will also provide a minimum positive gap.

In FIG. 2, ground engaging arm 136 rests upon the ground at its forward end which holds it in a pivotal position about pivotal axis 140 at a slight downwardly sloping angle beta (β) shown herein as about 2 degrees. The bottom surface of forward portion 122 is disposed at an angle alpha (α) with respect to the ground that is about 1 degree.

In FIG. 3, by contrast, frame 102 of agricultural harvesting head 100 has been lifted higher above the ground (or, alternatively, the ground contour has fallen away underneath agricultural harvesting head 100) such that ground engaging arm 136 is disposed at an even greater downwardly sloping angle beta (β), shown herein as about 11 degrees. In comparison, forward portion 122 has changed its angle alpha (α) with respect to the ground only slightly from the 1 degree of FIG. 2 to about 3 degrees in FIG. 3.

In FIG. 3, it is also clear that forward portion 122 has pivoted upward with respect to ground engaging arm 136 at the same time that ground engaging arm 136 is pivoted downward to maintain contact with the soil.

Thus, whenever frame 102 is raised or lowered with respect to the ground, forward portion 122 pivots through a smaller angle than ground engaging arm 136.

The distance "D" between forward portion 122 and the ground is maintained substantially constant. Furthermore, the arrangement by which forward portion is positioned provides for a positive but narrow spacing between the forward portion 122 and the ground over substantially the entire operating range of pivotal positions of ground engaging arm 136.

In alternative prior art arrangements, forward portion 122 was fixed to the ground engaging arm. In these arrangements, when the agricultural harvesting head 100 was lifted, and the ground engaging arms 136 tilted downward, the tip of the forward portion 122 would embed in the ground as shown by the phantom outline 170. This is prevented in the present arrangement by the mechanical link 154.

Forward portion 122 pivots upward with respect to ground engaging arm 136 when ground engaging arm 136 pivots downward. Similarly, forward portion 122 pivots downward with respect to ground engaging arm 136 when ground engaging arm 136 pivots upward.

Figure 4:
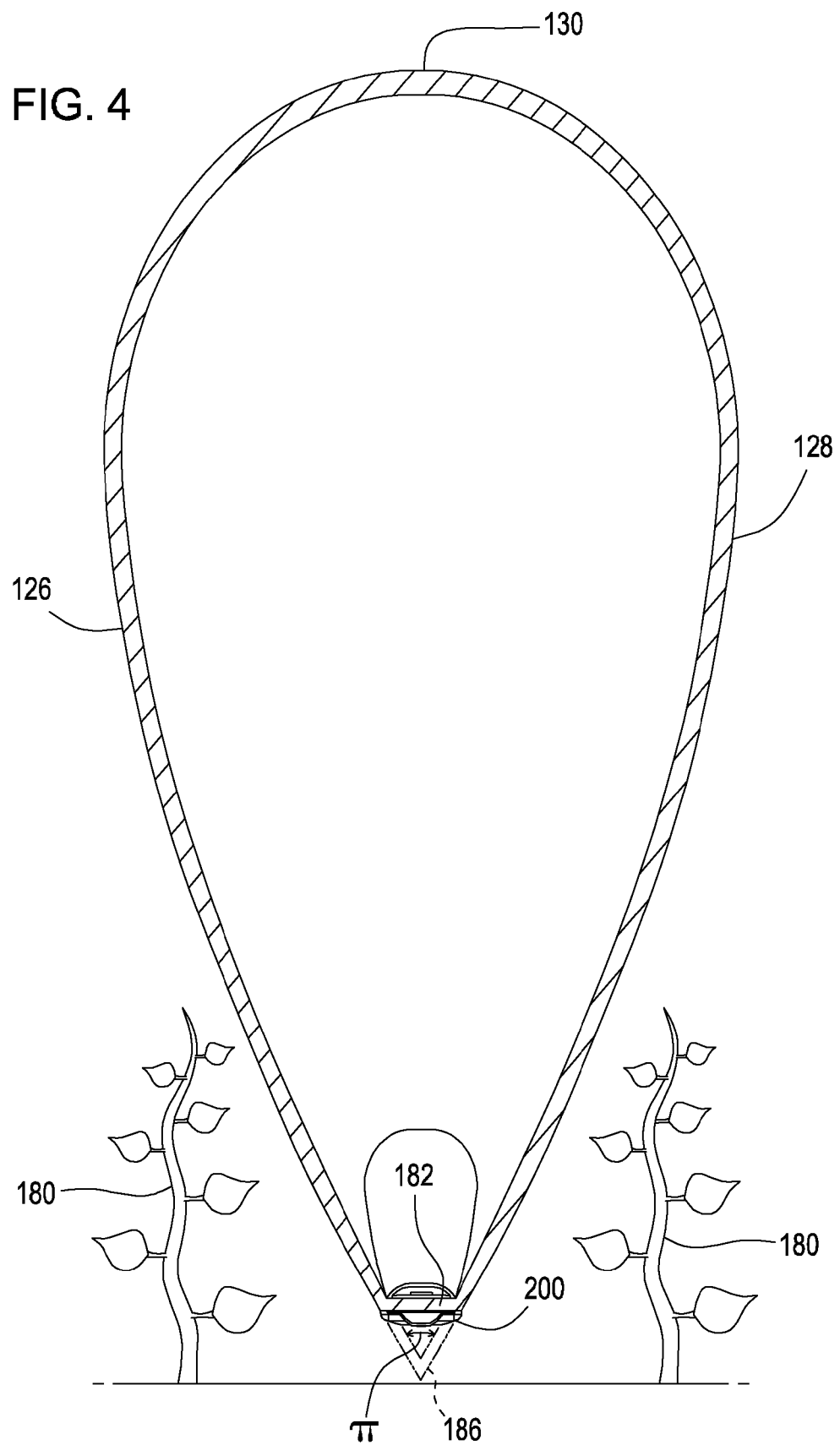
FIG. 4 is a cross sectional view of the crop divider of FIGS. 1, 2, and 3 taken at section line 4-4 in FIG. 3.

FIG. 4 illustrates a cross section of forward portion 122 showing its cross sectional shape, which is symmetrical about a fore-and-aft vertical axis. Forward portion 122 has an inverse teardrop shape, with a "V" shaped lower portion and a rounded top surface. The "V"-shaped lower portion permits the bottom of the forward portion 122 to be inserted between closely spaced crop plants 180 on the ground without substantially flattening the stalks as the crop divider 110 moves forward through the field. The sidewalls 126, 128 of the forward portion 122 are joined to, and converge downwardly from, the round top surface 130 and meet at a narrow bottom surface 182 and with downward extensions of the sidewalls 126, 128 meeting at a vertex 186 defining an included angle pi ($\pi$) of between 20 and 50 degrees.

The claims below define the invention. The invention is not defined by the description above. The description above is provided to illustrate one or more ways in which one embodiment of the invention can be made and used. The invention, however, is defined by the claims, not by the description of the embodiments above. There are numerous other ways (known and unknown) in which the invention and each of the elements of the claims below can be embodied and still fall within the scope of the claims.

I claim:

1. A crop divider (110, 112) mounted to each of opposite ends of an agricultural harvesting head (100), wherein the agricultural harvesting head is configured to travel in a first direction through an agricultural field harvesting crops, wherein the agricultural harvesting head (100) has a frame (102) that extends transversely to the first direction of travel, the frame (102) having laterally opposite right and left ends, wherein a ground engaging arm (136) extends forwardly from, and is pivotally coupled to said frame (102) at each of said opposite ends for pivoting about a horizontal transverse axis (140) in a working range between lower and upper positions, each crop divider comprising:
    a forward portion (122) including a bottom surface (182) extending in the first direction of travel, with the forward portion further including a lower rear region pivotally coupled to said ground engaging arm (136) at a first transverse pivot joint (150); and
    a fore-and-aft extending mechanical link (154) having a front end coupled to the forward portion (122) at a second transverse pivot joint (156) and having a rear end coupled to the frame (102) at a third transverse pivot joint (158),
    wherein the second and third transverse pivot joints are so located relative to each other and to the first transverse pivot joint (150) that the mechanical link (154) constrains the forward portion (122) to pivot counterclockwise with respect to the ground engaging arm (136) when the ground engaging arm (136) pivots clockwise with respect to the frame (102), and to pivot clockwise with respect to the ground engaging arm (136) when the ground engaging arm (136) pivots counterclockwise.

2. The crop divider (110, 112) of claim 1, wherein the forward portion (122) at least partly encloses a gearbox (144) for driving a reciprocating knife (108).

3. The crop divider (110, 112) of claim 1, wherein the forward portion (122) has an inverted teardrop shape in cross-section and is symmetrical about a fore-and-aft extending vertical plane.

4. The crop divider (110, 112) of claim 1, wherein the forward portion (122) pivots upward with respect to the ground engaging arm (138) when the ground engaging arm (138) pivots downward with respect to the frame (102), and further wherein the forward portion (122) pivots downward with respect to the ground engaging arm (138) when the ground engaging arm (138) pivots upward with respect to frame (102).

5. The crop divider (110, 112) of claim 1, wherein said mechanical link (154) is so located relative to said frame (102), to said ground engaging arm 136 and to said forward portion (122) of said crop divider (110, 112) that the forward portion (122) is held entirely above the ground and a minimum positive gap (D) is provided between the bottom surface of the forward portion (122) and ground that is horizontal during movement of said ground engaging arm within said working range.

6. The crop divider (110, 112) of claim 5, wherein the minimum positive gap (D) provided between the bottom surface of the forward portion (122) and ground that is horizontal is substantially constant over the entire operating range between the lower and upper positions of the ground engaging arm (136) with respect to the frame (102).

7. The crop divider (110, 112) of claim 1, wherein the location of the second transverse pivot joint connecting the front end of the mechanical link (154) to the forward portion (122) is at a point above and forward of the first pivot joint (150).

8. The crop divider (110, 112) of claim 1, further comprising a rear portion (124) fixed to the frame (102) behind the front portion (122).

9. A crop divider (110, 112) for an agricultural harvesting head (100), wherein the agricultural harvesting head is configured to travel in a first direction through an agricultural field harvesting crops, wherein the agricultural harvesting head (100) has a frame (102) that extends transversely to the first direction of travel, the frame (102) having laterally opposite right and left ends, wherein a ground engaging arm (136) is pivotally coupled to said frame (102) for vertical pivotal movement about a first transverse pivotal axis between lower and upper positions of a working range and extends forward from said frame (102) at each of said laterally opposite right and left ends, the crop divider comprising:
  a forward portion (122) pivotally coupled to, and extending forwardly from, said ground engaging arm (136) at a first pivot joint (150) defining a second transverse pivotal axis, said forward portion having a bottom surface extending an entire distance between front and rear ends of said forward portion; and
  a mechanical link (154) having front and rear ends respectively pivotally coupled to the forward portion (122) and to the frame (102),
  wherein the mechanical link (154) extends above said second transverse pivotal axis and is positioned and dimensioned such that it constrains pivotal movement of the forward portion (122) about said second transverse pivotal axis to maintain a minimum positive gap (D) between the bottom surface of the forward portion and ground that is horizontal as the ground engaging arm 136 pivots with respect to the frame (102).

10. The crop divider (110, 112) of claim 9, wherein the forward portion (122) at least partly encloses a gearbox (144) for driving a reciprocating knife (108).

11. The crop divider (110, 112) of claim 9, wherein the forward portion (122) has an inverted teardrop shape in cross-section with a round top surface (130) of said forward portion being centered vertically above said bottom surface and joined thereto by opposite converging sidewalls (126, 128).

12. The crop divider (110, 112) of claim 9, wherein the forward portion (122) pivots upward with respect to the ground engaging arm (138) when the ground engaging arm (138) pivots downward with respect to the frame (102), and further wherein the forward portion (122) pivots downward with respect to the ground engaging arm (138) when the ground engaging arm (138) pivots upward (with respect to frame (102).

13. The crop divider (110, 112) of claim 9, wherein the mechanical link (154) constrains the forward portion (122) to pivot counterclockwise with respect to the ground engaging arm (136) when the ground engaging arm (136) pivots clockwise with respect to the frame, and to pivot clockwise with respect to the ground engaging arm (136) when the ground engaging arm (136) pivots counterclockwise with respect to the frame.

14. The crop divider (110, 112) of claim 9, wherein the minimum positive gap is provided between the bottom surface of the forward portion (122) and ground that is horizontal over the entire operating range of pivotal positions of the ground engaging arm (136) with respect to the frame (102).

15. The crop divider (110, 112) of claim 9, wherein the second transverse pivotal axis 152 is located at a bottom rear region of the forward portion (122).

16. The crop divider (110, 112) of claim 15, wherein the rear end of the mechanical link (154) is coupled to the frame 102 at a point above and forward of the first transverse pivotal axis 140.

17. The crop divider (110, 112) of claim 9, further comprising a rear portion (124) fixed to the frame (102) behind the front portion (122).

* * * * *